Aug. 23, 1932.    M. T. SCHUMB ET AL    1,873,491
VARIABLE SPEED MOTOR
Filed Feb. 26, 1932
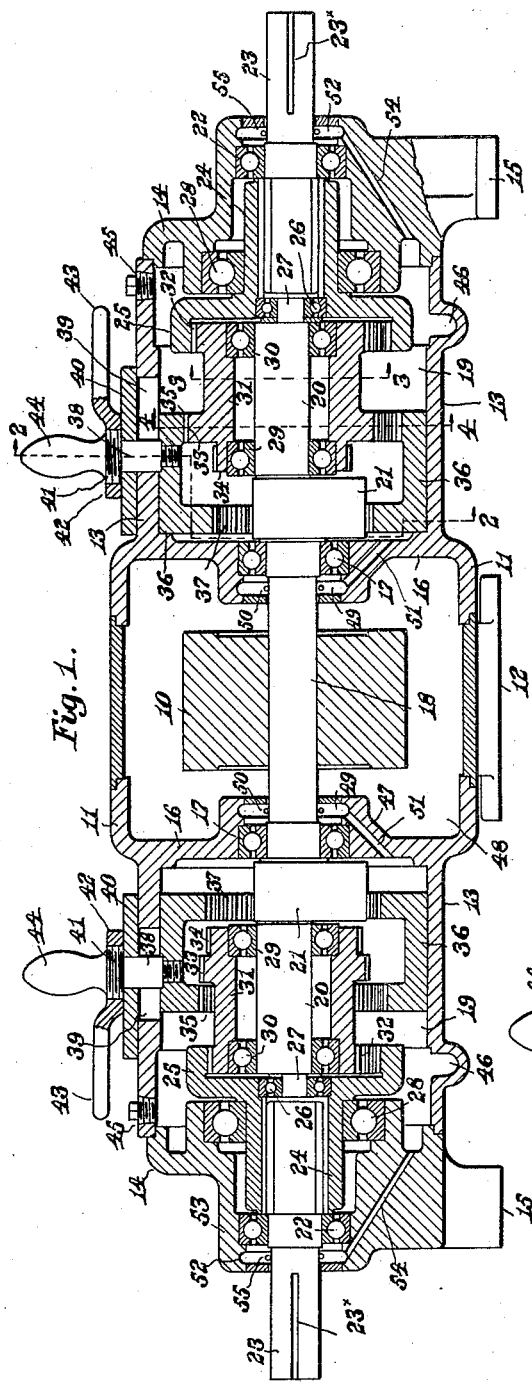
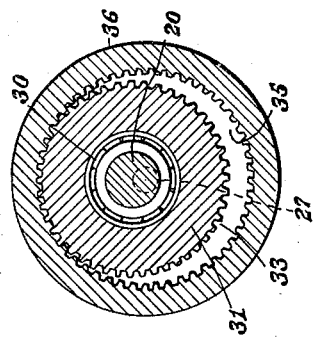
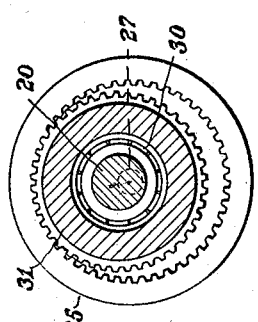
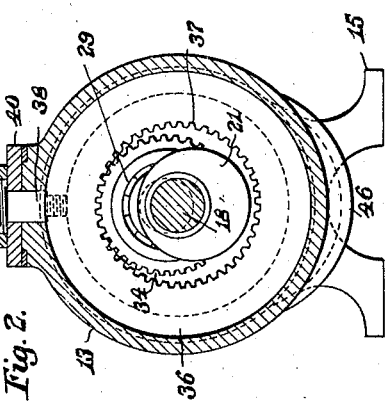
Inventors:
Martin T. Schumb,
Emile E. Tougas,
by Walter E. Lombard, Atty.

Patented Aug. 23, 1932

1,873,491

UNITED STATES PATENT OFFICE

MARTIN T. SCHUMB, OF MILTON, AND EMILE E. TOUGAS, OF WOLLASTON, MASSACHUSETTS, ASSIGNORS TO BOSTON GEAR WORKS, INC., OF NORFOLK DOWNS, MASSACHUSETTS, A CORPORATION OF MASSACHUSETTS

VARIABLE SPEED MOTOR

Application filed February 26, 1932. Serial No. 595,341.

This invention relates to electric motors combined with change speed gearing and has for its object the production of a device of this character which has permanently connected to its shaft means confined within the motor casing which is adapted to rotate at a reduced speed a driven shaft revoluble in bearings in said casing.

This object is attained by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing

Figure 1 represents a longitudinal vertical section of a machine embodying the principles of the present invention.

Figure 2 represents a transverse section of same on line 2, 2, on Fig. 1.

Figure 3 represents a section on line 3, 3, on Fig. 1, and

Figure 4 represents a section on line 4, 4, on Fig. 1.

Similar characters indicate like parts throughout the several figures of the drawing.

In the drawing, 10 is the rotor of an electric motor.

This rotor is enclosed within the casing 11 mounted upon a base 12 and having extending from its opposite ends annular extensions 13, the outer ends of which have secured thereto closures 14 each having a supporting base 15.

The casing 11 has walls 16 therein in which are mounted anti-friction bearings 17 through which extend the opposite ends of the motor shaft 18.

The annular extensions 13 and closures 14 therefor form closed chambers 19 in which are disposed eccentrics 20 and counter-balances 21 for said eccentrics, these eccentrics 20 and counter-balances 21 rotating with the motor shaft 18.

Each closure 14 is provided with an anti-friction bearing 22 through which extends a driven shaft 23, the inner end of this driven shaft 23 having secured thereto the hub 24 of an internal gear 25.

The outer end of each driven shaft 23 is provided with a keyway 23x providing a means whereby said shaft 23 may be keyed to any mechanism which it is desired to actuate.

Centrally disposed in the internal gear 25 is an antifriction bearing 26 to receive the reduced end 27 of the shaft 18, the axes of the reduced end 27 and shaft 18 being in alinement.

The closure 14 is also provided with an anti-friction bearing 28 through which the hub 24 of the internal gear 25 projects.

On each eccentric 20 are two anti-friction bearings 29, 30, surrounded by a freely revoluble annular member 31 having spur gear teeth 32 at one end thereof always meshing with the teeth of the internal gear 25.

The opposite end of said annular member 31 is provided with two sets of spur gear teeth 33 and 34 of different diameters.

The teeth of the spur gear 33 are adapted to engage the teeth 35 on an annular slidable member 36, said member also having internal gear teeth 37 adapted to mesh with the teeth of the spur gear 34.

Extending outwardly from the slidable member 36 is a stud 38, this stud projecting through an elongated slot 39 in the annular extension 13 which slot is covered by means of a plate 40 surrounding said stud 38 and slidable lengthwise of the extension 13.

The stud 38 is provided with an enlarged threaded portion 41 to which is threaded a clamp plate 42 provided with an actuating handle 43.

By actuating the handle 43 the plate 40 may be forced downwardly against the outer portion of the extension 13 and clamp the slidable member 36 in adjusted position either with the internal gear teeth 35 meshing with the spur gear teeth 33, the internal gear teeth 37 meshing with the spur gear teeth 34, or with the slidable member 36 in a neutral position with neither of the spur gears in engagement with the internal gears 35 and 37.

When the clamping plate 42 is unclamped the slidable member 36 may be moved endwise within the chamber 19 by means of the handle 44.

In the upper part of each extension 13 is a filling plug 45 which upon removal permits each chamber 19 to be filled with lubricant, thereby providing a means for lubricating the speed reduction gears confined within said closed chambers 19.

In the lower part of each extension 13 is a sediment collector 46.

In the hubs 47 projecting into the chamber 48 in which the rotor is disposed are formed annular recesses 49 surrounding the motor shaft 18 and in these recesses and surrounding the motor shaft 18 are oil slingers 50.

The recesses 49 communicate by passages 51 with the lower ends of the chamber 19 thereby permitting oil to enter said recesses and be thrown about by the slingers 50 to lubricate the bearings 17.

A similar recess 52 is formed in the outer end of the extending hub 53 of the closures 14.

These recesses 52 communicate with the lower end of the closed chambers 19 by means of passages 54.

In each recess 52 and surrounding the outer end of the shafts 23 are oil slingers 55 adapted to throw the oil so as to lubricate the bearings 22.

The planetary gearing in one closed chamber 19 varies in dimensions from the planetary gearing in the other closed chamber 19 so that the driven shaft 23 at one end of the motor casing may be driven at one speed while the driven shaft 23 at the opposite end of said casing may be driven at an entirely different speed.

Furthermore, by allowing the internal gear 35 to mesh with the spur gear 33 as shown at the right of Fig. 1 of the drawing, the driven shaft 23 at the right hand end of the casing will be driven at one speed and when gear teeth 34 and 37 are brought into mesh, said shaft 23 will be driven at an entirely different speed.

When rotary movement is being thus transmitted from the shaft 18 through speed reduction mechanism to the shaft 23 at the right of Fig. 1 of the drawing, the slidable member 36 may be clamped in neutral position, as indicated at the left of Fig. 1 of the drawing, and in this case no rotary movement will be transmitted from the motor shaft to the driven shaft 23 at the left of said figure.

The oil slingers 50, 55 not only assist in lubricating the movable parts and bearings of the mechanism but they also prevent any outward movement of the oil from the ends of the shafts 23 and any movement along the shaft 18 of the oil into the chamber 48 containing the rotor 10.

If desired, however, the slidable member 36 at the left of Fig. 1 may be moved into a position whereby one of the spur gears 33 or 34 may be engaged with an internal gear 35 or 37 and rotary movement imparted to both of the shafts 23.

Preferably the spur gears 33, 34 and internal gears 35, 37, in one of the closed chambers 19 are of different diameters from similar spur gears and internal gears in the other closed chamber 19.

By this means a great variety of speeds may be obtained from either one end of the motor or the opposite end thereof.

By the construction such as is herein shown and described, the motor may be supplied to the trade with the speed reduction gearing mounted in the casing thereof, thus obviating the necessity of providing a separate speed reduction mechanism to be coupled to the projecting end of a motor shaft.

This saves considerable expense and labor and the motor when installed is ready to operate at once to drive either or both of the driven shafts 23.

These shafts 23 may be coupled up with any machine it is desired to operate.

As all of the gearing in the closed chambers 19 rotate in lubricant all the mechanism within the motor casing will freely operate.

As there is no invention in the motor itself, it is deemed unnecessary to illustrate the same in detail.

It is believed that the operation and many advantages of the invention will be understood without further description.

Having thus described our invention, we claim:

1. In combination with an electric motor, a casing therefor provided at one end with an annular extension in which is disposed an eccentric on the motor shaft; a counter-balance for said eccentric on said motor shaft; a closure for said extension; a driven shaft rotatable in bearings therein; an internal gear on said driven shaft; a member freely revoluble on said eccentric provided with teeth at one end meshing with said internal gear and having two spur gears at its opposite end; and a slidable member within said extension provided with two internal gears one of which is adapted to coact with one of said spur gears at the extreme of the movement of said member in either direction.

2. In combination with an electric motor, a casing therefor provided at one end with an annular extension in which is disposed an eccentric on the motor shaft; a counter-balance on said motor shaft; a closure for said extension; a driven shaft rotatable in bearings therein; an internal gear on said driven shaft; a member freely revoluble on said eccentric provided at one end with teeth meshing with said internal gear and having two spur gears at its opposite end; a slidable member within said extension having two internal gears one of which is adapted to coact with one of said spur gears at the extreme of the movement of said member in either direction; and means for locking said slidable member in its adjusted position.

3. In combination with an electric motor, a casing therefor provided at one end with a closed chamber in which is disposed an eccentric on the motor shaft; a counter-balance for said eccentric on said shaft; a driven shaft rotatable in bearings in the outer wall of said chamber; an internal gear on said driven shaft; a member freely revoluble on said eccentric provided at one end with teeth meshing with said internal gear, and having two spur gears at its opposite end; a slidable member within said chamber provided with two internal gears one of which is adapted to coact with one of said spur gears at the extreme of the movement of said slidable member in either direction; a threaded stud projecting from said slidable member through a slot in the wall of said chamber; and a clamping lever threaded to said stud.

4. In combination with an electric motor, a casing therefor provided at each end with a closed chamber in each of which is disposed an eccentric on the motor shaft; a counter-balance for each eccentric on said motor shaft; a driven shaft rotatable in bearings in the outer wall of each chamber; an internal gear on the inner end of each driven shaft; a member freely revoluble on each eccentric provided with teeth at one end meshing with an internal gear, and having two spur gears at its opposite end; and a slidable member within each chamber having two internal gears one of which gears is adapted to coact with one of said spur gears at the extreme of the movement of said slidable member in either direction.

5. In combination with an electric motor, a casing therefor provided at one end with a closed chamber in which is disposed an eccentric on the motor shaft; a counter-balance for said eccentric on said motor shaft; a driven shaft rotatable in bearings in the outer wall of said chamber and alined with said motor shaft; an internal gear on said driven shaft; a member freely revoluble on said eccentric provided at one end with teeth meshing with said internal gear, and having at its opposite end two spur gears; a slidable non-rotatable member within said extension having two internal gears of different diameters, one of which is adapted to coact with one of said spur gears at the extreme of the movement of said slidable member in either direction, the internal gears of said slidable member being separated sufficiently to permit disengagement with the spur gears when said slidable member is in neutral position; and means for locking said slidable member in adjusted position.

6. In combination with an electric motor, a casing therefor provided at each end with a closed chamber in which is disposed an eccentric on the motor shaft; a counter-balance for said eccentric on said motor shaft; a driven shaft rotatable in bearings in the end wall of each chamber; an internal gear on each driven shaft; a member freely revoluble on each eccentric provided with teeth meshing with an internal gear on each driven shaft, and having at its opposite end two spur gears; a slidable member within each closed chamber having two internal gears one of which is adapted to coact with one of said spur gears on an eccentric at the extreme of the movement of said slidable member in either direction, said spur gears and internal gears on said slidable member being separated sufficiently to permit disengagement thereof when said slidable member is in neutral position; and means for locking said slidable member in adjusted position.

Signed by us at North Quincy, Mass., this 20 day of February, 1932.

MARTIN T. SCHUMB.
EMILE E. TOUGAS.